United States Patent
Marque-Pucheu

(10) Patent No.: US 6,442,209 B1
(45) Date of Patent: Aug. 27, 2002

(54) DIGITAL RADIO COMMUNICATION STATION

(75) Inventor: Gérard Marque-Pucheu, Paris (FR)

(73) Assignee: Matra Nortel Communications, Quimper (FR)

( * ) Notice: Subject to any disclaimer, the term of this patent is extended or adjusted under 35 U.S.C. 154(b) by 0 days.

(21) Appl. No.: 09/129,791

(22) Filed: Aug. 6, 1998

(30) Foreign Application Priority Data

Aug. 8, 1997 (FR) .............................................. 97 10214

(51) Int. Cl.[7] .............................................. H04L 27/00
(52) U.S. Cl. ..................... 375/259; 704/200; 714/752; 714/786
(58) Field of Search .................................. 375/224, 225, 375/262, 265, 240, 259, 295; 714/752, 747, 786, 790, 795; 704/200, 500, 503

(56) References Cited

U.S. PATENT DOCUMENTS

| | | | | |
|---|---|---|---|---|
| 5,416,829 A | * | 5/1995 | Umemoto | 379/58 |
| 5,446,739 A | | 8/1995 | Nakano et al. | |
| 5,490,168 A | | 2/1996 | Phillips et al. | |
| 5,581,577 A | * | 12/1996 | Abe | 375/225 |
| 5,666,357 A | * | 9/1997 | Jangi | 370/345 |
| 5,883,899 A | * | 3/1999 | Dahlman et al. | 370/468 |
| 5,953,376 A | * | 9/1999 | Wei | 375/265 |

FOREIGN PATENT DOCUMENTS

| | | |
|---|---|---|
| EP | 0 538 546 | 4/1993 |
| EP | 0 564 429 | 10/1993 |
| GB | 2 287 381 | 9/1995 |
| JP | 402278940 A * | 11/1990 |
| WO | WO 92/21195 | 11/1992 |
| WO | WO95/01682 | 1/1995 |
| WO | WO 97/04610 | 2/1997 |
| WO | WO 97/11535 | 3/1997 |

OTHER PUBLICATIONS

Gottfried Ungerboeck, "Channel Coding with Multilevel/Phase Signals", IEEE Transactions on Information Theory, Jan. 1982, vol. IT–28, No. 1, pp. 55–67.

* cited by examiner

Primary Examiner—Jean Corrielus
(74) Attorney, Agent, or Firm—Trop, Pruner & Hu, P.C.

(57) ABSTRACT

The station includes a coded speech signal source having a given digital rate, a modulator for producing a radio signal from the coded speech signal provided by the source, and a redundancy encoder having a coding rate of the form K/N, where K and N are integers such that 0<K<N. An operating mode of the station is selected from at least a first operating mode where the modulator directly receives the coded speech signal and converts it into a radio signal occupying a determined fraction of time on a carrier frequency, and a second operating mode where the redundancy encoder receives the coded speech signal, and the modulator receives the output signal from the redundancy encoder and converts it into a radio signal occupying N/K times the determined fraction of time on a carrier frequency.

10 Claims, 1 Drawing Sheet

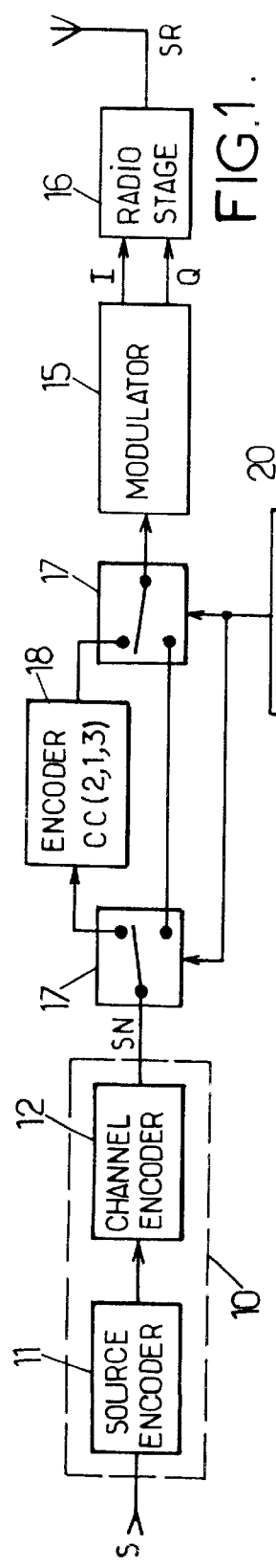
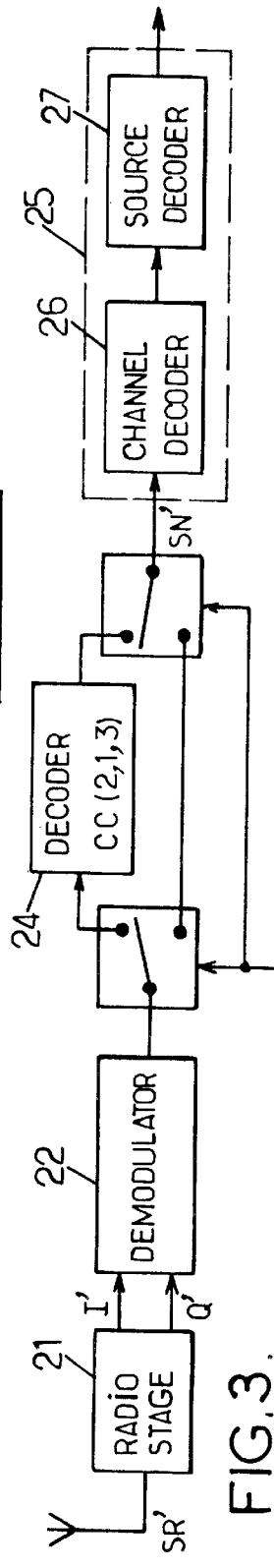
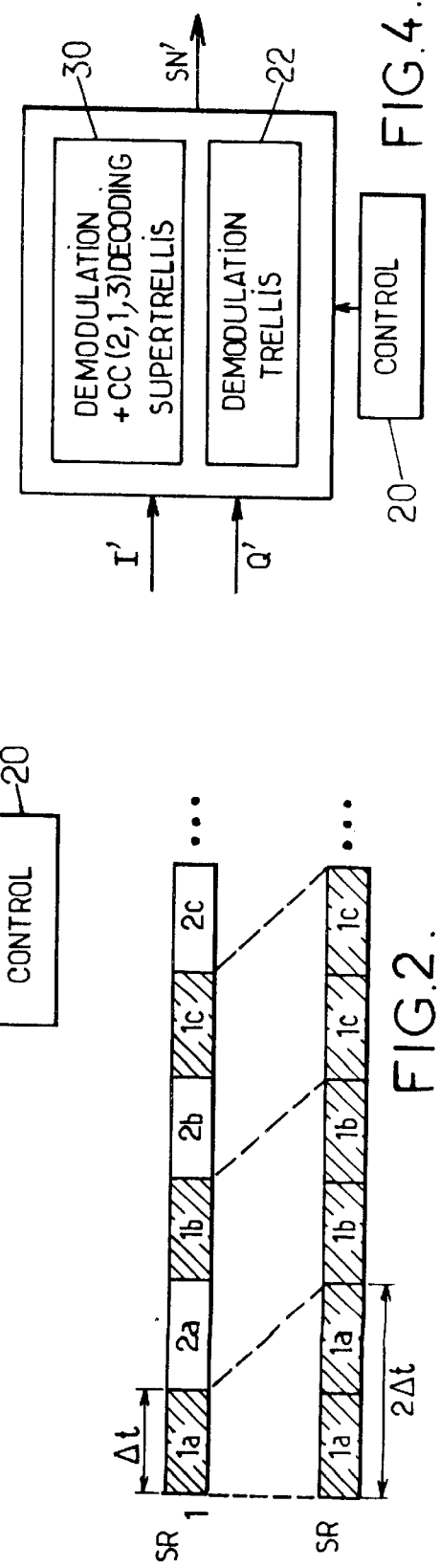

DIGITAL RADIO COMMUNICATION STATION

BACKGROUND OF THE INVENTION

This invention concerns digital radio communication. It applies in particular to professional mobile radio communication systems.

In general, two requirements are to be satisfied in this field.

On the one hand, a radio communication network must provide radio coverage which is as extensive as possible, while using the smallest possible number of base stations.

On the other hand, the radio communication system must permit the maximum possible number of simultaneous communications in a given frequency band. This calls for a spectral efficiency which is even higher when the environment has a high communication density, as is often the case in urban areas.

The two requirements referred to above are difficult to reconcile, since they correspond to conflicting conditions for the definition of the parameters of the radio communication system. Indeed, a reduction in the spectral occupancy of the communications entails a reduction in the sensitivity of the radio receivers. This causes a reduction in the range of transmitters, and the need to increase the number of base stations for a given coverage and quality.

An object of the present invention is to overcome these drawbacks, by proposing a particular method of organising the radio transmission channels.

SUMMARY OF THE INVENTION

The invention thus proposes a digital radio communication station including a coded speech signal source having a given digital rate, and modulating means for producing a signal from the coded speech signal provided by the source. According to the invention, the station further includes a redundancy encoder having a coding rate of the form K/N, where K and N are integers such that 0<K<N, and control means for selecting an operating mode of the station from at least a first operating mode where the modulating means directly receive the coded speech signal provided by the source and convert it into a radio signal occupying a determined fraction of time on a carrier frequency, and a second operating mode where the redundancy encoder receives the coded speech signal provided by the source and the modulating means receive the output signal from the redundancy encoder and convert it into a radio signal occupying N/K times said determined fraction of time on a carrier frequency.

The second operating mode provides greater sensitivity of the stations in communication, at the expense of greater occupancy of the available spectrum resources. Thus, the same station (base station or portable terminal) using the same coded speech signal source and the same modulating means may be used advantageously in the first mode if the surrounding traffic is very dense (typically in urban areas), and in the second mode in areas where the traffic is less dense and maximum radio coverage is looked for.

The invention is advantageously applied to frequency-division or code-division multiple-access (FDMA or CDMA) radio communication systems. In this case, the above-mentioned determined fraction of time on a carrier frequency is equal to K/N. The time occupancy of the carrier is divided into uniform time intervals. A communication uses 100% of these time intervals in the second mode, and only a proportion K/N in the first mode. It is convenient that these time intervals each correspond to a frame of the coded speech signal.

The invention may also be applied to time-division multiple-access (TDMA) radio communication systems. A communication may then be allocated a larger or smaller fraction of time on a given carrier by reserving a suitable number of elementary TDMA timeslots on the carrier.

BRIEF DESCRIPTION OF THE DRAWINGS

FIGS. 1 and 3 are block diagrams of the transmitting and receiving sections, respectively, of a radio communication station according to the invention.

FIG. 2 is a timing diagram showing the structure of radio communication channels used by a station according to the invention.

FIG. 4 is a partial diagram of an advantageous alternative of the receiving section of the station.

DESCRIPTION OF PREFERRED EMBODIMENTS

The transmitting section of the station shown in FIG. 1 comprises a source 10 of coded speech signal SN. In the example shown, the source processes the speech signal (S) addressed thereto, using a source encoder 11. The compressed speech signal from the encoder 11 is fed to a channel encoder 12 which, in a known manner, applies error-correcting coding and/or interleaving. The coded speech signal SN is consists of the signal from the channel encoder 12. It has a given digital rate D determined by the characteristics of the encoders 11 and 12.

The coded speech signal source 10 shown in FIG. 1 may be the one included in a portable terminal, whereby the signal S is provided by the terminal microphone. It may also be included in a base station if the speech signal S is available at such base station. On the other hand, if the coded signal SN but not the original signal S is available at the base station, the coded speech signal source is constituted by the receiving and processing sections of the station which restore the digital signal SN to be transmitted.

The transmitting section of the station comprises a modulator 15 which receives the digital signal obtained from the coded speech signal SN. The modulator 15 conventionally delivers two baseband quadrature components I,Q which an associated radio stage 16 mixes with two quadrature waveforms at a carrier frequency, in order to produce the radio signal SR transmitted via the station antenna.

The radio communication station has two operating modes, as illustrated by the two switches 17 on the schematic diagram of FIG. 1.

In the first mode, the coded speech signal SN is fed directly to the input of the modulator 15. In the second mode, this signal SN is fed to the input of a redundancy encoder 18 whose output provides the signal applied to the modulator 15. The redundancy encoder 18 has a coding rate of the form K/N, where 0<K<N, i.e. for K symbols of the coded speech signal SN received, it yields N symbols to the input of the modulator 15.

In a simple embodiment of the invention, the redundancy encoder (18) may be a convolutional encoder. In the example shown, it is a CC(2,1,3) convolutional encoder of rate ½(K=1, N=2).

The modulator 15 applies the same modulation scheme in both operating modes of the station.

By way of example, the case of a FDMA system is considered, where the modulator 15 admits an input digital rate of 16 kbit/s, with radio channels of width 12.5 kHz. The average digital rate D of signal SN from the source 10 is lower than 16 kbit/s, in a ratio K/N. In the example considered, it is D=8 kbit/s. The source 10 transmits the signal SN in the form of successive binary frames with a length $\Delta t$ of 10 to 30 ms, for example $\Delta t$=20 ms. In order to leave space for redundancy bits when the encoder 18 is used, only one frame period (of length $\Delta t$) out of two is occupied by a frame of the signal SN formed of binary symbols at an instantaneous rate of 16 kbit/s.

Thus, in the first operating mode of the station, the radio signal SR, resulting from the transformation of the signal SN from the source 10 by the modulator 15, only occupies a fraction of time K/N on the carrier frequency. This is illustrated in the first line of FIG. 2 which represents a communication 1 for which the successive frames 1a, 1b, 1c, etc. occupy one time interval $\Delta t$ out of two. The other time intervals may be used in order to create another logic channel which can be used for another radio communication (frames 2a, 2b, 2c, etc. of another communication 2).

In the second mode, the redundancy encoder 18 transmits a full-time 16 kbit/s signal to the modulator 15. Each frame 1a, 1b, 1c, etc. occupies a period $(N/K).\Delta t=2.\Delta t$, so that the radio signal SR resulting from the output of the source 10 occupies the whole time on the carrier frequency, i.e. N/K times the corresponding fraction in the first mode. As shown in the second line of FIG. 2, the physical channel is unable to accommodate another communication in the second mode.

The first operating mode thus increases the traffic capacities, compared with the second mode. The first mode is suitable for areas with a high traffic density such as urban areas.

On the other hand, because of the redundancy introduced by the encoder 18, the second mode improves the sensitivity of the receivers by 3 to 5 dB if K/N=½. In other words, the range of communication may be increased, so that the second mode is well suited for areas where the geographical density of base stations is relatively low.

It must be noted that such good adaptation of the station to different environments is achieved using the same coded speech signal source 10 and the same modulating chain 15,16. It is sufficient to essentially provide for a redundancy encoder 18 whose structure is very simple, and for control means suitable for putting it into service selectively depending on the environment.

Those control means consist of a module 20 shown in the diagram of FIG. 1. The operation of this module 20 is as follows. During the signaling exchange between a base station and portable terminal before a communication is established on a traffic channel, the base station notifies the portable terminal which operating mode should be used. That mode will essentially depend on the site at which the base station is located. Nevertheless, it may be noted that a given base station supporting several communications with portable terminals at a given time can certainly operate using different modes for those communications. For instance, the definition of the operating mode may depend on parameters such as a priority allocated to a communication compared with others (for example, provision could be made for a priority communication to take place in the second mode, with better sensitivity, even in areas with a high traffic density). It is also possible to design protocols where the operating mode used for a given communication would depend on the quality of the radio link noted during the communication.

Once the two stations know the operating mode to be adopted, their modules 20 control the on/off setting of their redundancy encoders 18 and associated decoders, for the transmission of speech signals on the traffic channel.

If the radio communication system supports communications in the walkie-talkie mode, i.e. direct communications between portable terminals, it is preferable to carry out those communications in the second mode in order to simplify synchronisation problems.

The common signaling channels, used in particular by the base station for notifying portable terminals of the operating mode to be used, are based on the second operating mode, that is to say the signaling signals are fed to the input of the redundancy encoder 18 before being applied to the modulator 15. Portable terminals which are close to the sensitivity limit of the second mode may thus correctly decode the signaling data transmitted. In view of the importance of this data, additional protection is provided. The data is thus applied to another error-correcting encoder before being transmitted to the redundancy encoder 18, so that the receiving station can detect and/or correct transmission errors in the signaling data. This other redundancy encoder preferably applies a block code such as, e,g, a BCH or Reed-Solomon code.

The receiving section of the station of which FIG. 1 shows the transmitting section is shown diagrammatically in FIG. 3. That receiving section is designed to handle the radio signal SR' received from a transmitter in accordance with FIG. 1. A radio stage 21 conventionally converts this signal SR' into two baseband quadrature components I',Q' which are transmitted to the demodulator 22. A control module 20 activates a decoder 24 selectively in accordance with the operating mode used. An estimate SN' of the coded speech signal SN is restored at the output of the demodulator 22 in the first operating mode, and at the output of the decoder 24 in the second operating mode.

The demodulator 22 carries out operations dial to those of the modulator 15. The decoder 24 uses the redundancy introduced by the encoder 18 for detecting and/or correcting possible transmission errors. It consists, for example, of a decoding trellis operating in accordance with the Viterbi algorithm. The estimate SN' of the coded speech signal is fed to a processing chain 25 comprising, for example, a channel decoder 26 and source decoder 27 corresponding respectively to the encoders 12 and 11 of the transmitter.

In the embodiment of FIG. 3, the encoder 24 provides a receiving gain, in the second operating mode, of some 3 dB over the first mode in the case where K/N=½.

This gain may be further improved by using two demodulators 22 and 30 selected by the control module 20 in accordance with the operating mode, as shown in FIG. 4. The demodulator 22 used in the first operating mode is similar to the one used in the embodiment of FIG. 3. It is, for example, a demodulation trellis using the Viterbi algorithm on the basis of the states of the digital modulator 15 of FIG. 1. The other demodulator 30 directly provides the estimate SN' of the coded speech signal from the components I',Q' in the second operating mode. This demodulator 30 combines the states of the redundancy encoder 18 and of the digital modulator 15 of the transmitter in accordance with the principle of coded modulations (see G. Ungerboeck "Channel coding with Multi-level/Phase signals", IEEE Transactions on Information Theory, Vol. IT-28, no. 1, January 1982). The demodulator 30 may, for example, be a demodulation and decoding supertrellis operating in accordance with the Viterbi algorithm with combined modulation and CC(2,1,3) coding states. The demodulator 30 provides receiving gains, in the second operating mode, of up to some 5 dB over the first mode in the case where K/N=½.

What is claimed is:

1. A digital radio communication station, comprising: a coded speech signal source having a given digital rate; modulating means for producing a radio signal from the coded speech signal provided by the source; a redundancy encoder having a coding rate of the form K/N, where K and N are integers such that 0<K<N; and control means for selecting an operating mode of the station from at least first and second operating modes, wherein, in the first operating mode, the modulating means directly receive the coded speech signal provided by the source and convert said coded speech signal into said radio signal, whereby said radio signal occupies a determined fraction of time on a carrier frequency, and wherein, in the second operating mode, the redundancy encoder receives the coded speech signal provided by the source and the modulating means receive an output signal from the redundancy encoder and convert said output signal into said radio signal, whereby said radio signal occupies N/K times said determined defined fraction of time on a carrier frequency.

2. A radio communication station in accordance with claim 1, further comprising an error-correcting encoder to which signaling data is applied, and wherein said signaling data is transmitted in the second operating mode, an output from said error-correcting encoder being fed to an input of the K/N-rate redundancy encoder.

3. A radio communication station in accordance with claim 2, wherein said error-correcting encoder applies a block code.

4. A radio communication station in accordance with claim 1, wherein K=1 and N=2.

5. A radio communication station in accordance with claim 1, wherein the K/N-rate redundancy encoder is a convolutional encoder.

6. A radio communication station in accordance with claim 1, wherein said determined fraction is equal to K/N, and wherein the occupancy of the carrier frequency is distributed in uniform time intervals, fully allocated to the coded speech signal source in the second operating mode, and uniformly allocated in the proportion K/N in the first operating mode.

7. A radio communication station in accordance with claim 6, wherein each of said time intervals correspond to a frame of the coded speech signal.

8. A radio communication station in accordance with claim 6, wherein said time intervals are of 10 to 30 ms.

9. A radio communication station in accordance with claim 1, further comprising reception means for processing a radio signal transmitted from another station which also supports the two operating modes, the reception means comprising a first demodulator which, in the first operating mode, carries out operations dual to the operations carried out by the modulator of said other station, and a second demodulator used in the second operating mode and combining states of the redundancy encoder and of the modulating means of said other station.

10. A digital radio communication station, comprising: a coded speech signal source having a given digital rate; a modulator to produce a radio signal from the coded speech signal provided by the source; a redundancy encoder having a coding rate of the form K/N, where K and N are integers such that 0<K<N; and a controller to select an operating mode of the station from at least first and second operating modes;

wherein, in the first operating mode, the modulator directly receives the coded speech signal provided by the source and converts said coded speech signal into said radio signal, whereby said radio signal occupies a determined fraction of time on a carrier frequency, and wherein, in the second operating mode, the redundancy encoder receives the coded speech signal provided by the source and the modulator receives an output signal from the redundancy encoder and converts said output signal into said radio signal, whereby said radio signal occupies N/K times said determined defined fraction of time on a carrier frequency.

* * * * *